Sept. 27, 1949.  R. STRUB  2,483,073
GAS TURBINE SYSTEM
Filed April 24, 1944
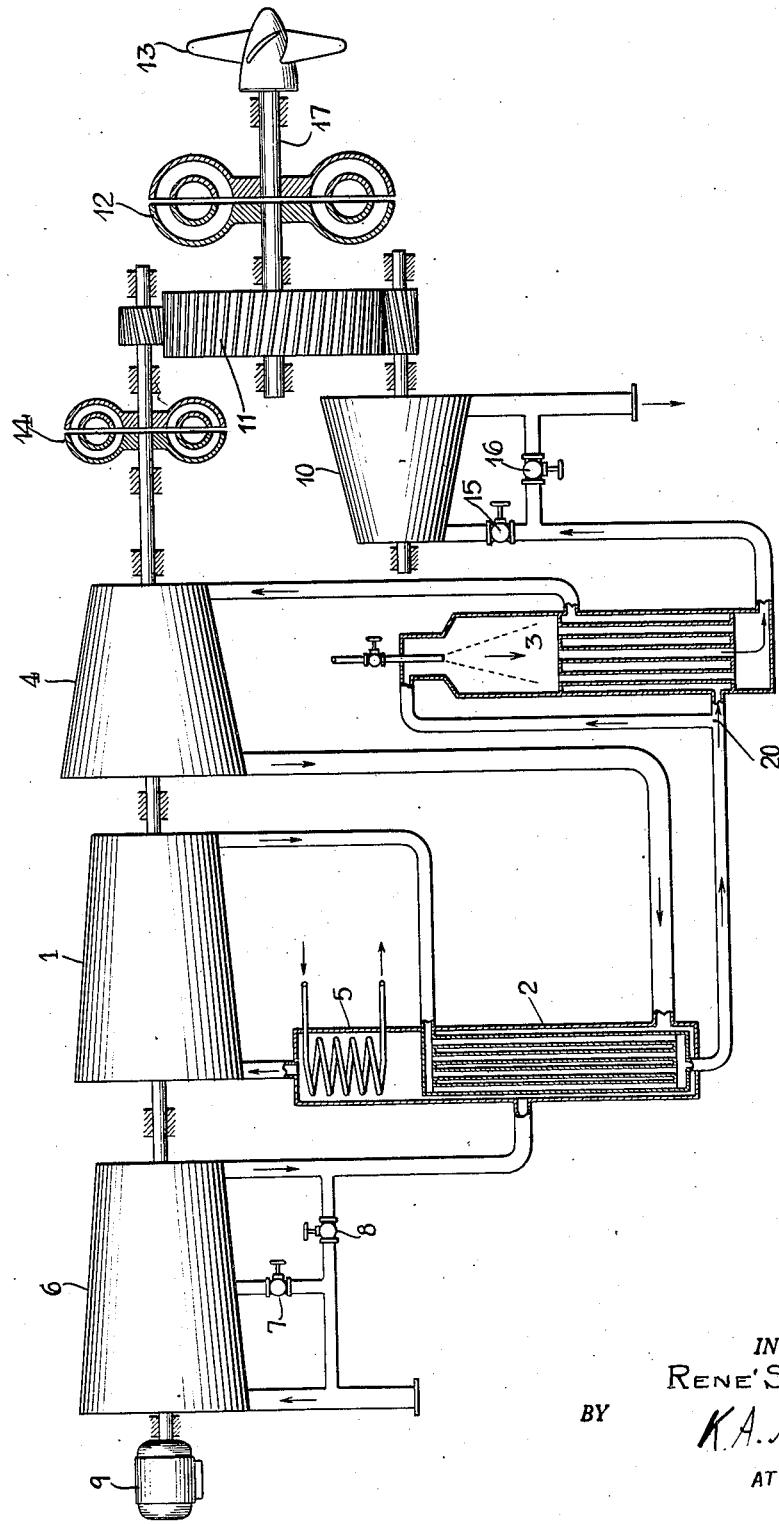
INVENTOR.
RENE' STRUB.
BY
K. A. Mayr.
ATTORNEY Patented Sept. 27, 1949

2,483,073

UNITED STATES PATENT OFFICE 2,483,073

GAS TURBINE SYSTEM

René Strub, La Chaux-de-Fonds, Switzerland

Application April 24, 1944, Serial No. 532,504

7 Claims. (Cl. 60—102)

The invention relates to a system for starting marine gas turbine plants having one or more turbines for driving the compressors and one or more turbines for driving the propeller. The system proposed in the invention is characterised in that during starting at least the greater part of the power of the useful output turbine is employed for driving one or more of the compressors.

When the speed of the compressor rises after starting the output of the compressor turbine can be increased and the output of the useful output turbine which is used for driving the compressor can be diminished. In a gas turbine plant according to the invention a device is provided by means of which the power given up by the useful output turbine to the ship's propeller can be diminished or cut off. For instance, a clutch coupling can be provided between the useful output turbine and the propeller. Between the useful output turbine and the compressor turbine a gear with variable speed ratio can be inserted. It is expedient to arrange a shut-off device in the gas supply pipe to the useful output turbine and at the same time to provide a by-pass pipe with stop valve.

A gas turbine plant according to the invention is explained in more detail below with the aid of the drawing.

The working medium compressed by the compressor 1 passes into the heat-exchanger 2, in which it is preheated with waste heat from the plant. At the point 20 in the outlet pipe from the heat-exchanger the working medium is divided, a part of it passing into the heater 3 where it flows over the heat-exchange pipes and is brought up to the maximum working temperature.

The compressed and heated working medium then passes into the turbine 4, expands there and flows into the space surrounding the heat-exchange pipes of the heat-exchanger 2, where it gives up part of its residual heat to the working medium coming from the compressor 1. A further part of the residual heat is led off by a cooling-medium in the cooler 5, whereupon the working medium again flows to the low-pressure compressor 1 and recommences the circuit.

The other part of the working medium after diversion at the point 20 is withdrawn from the circuit and supplied to the burner of the gas heater 3 as combustion air. The combustion gases flow through the heat-exchange pipes of the heater 3 and then pass to the turbine 10 from which they can be led off after expansion to further points of consumption not shown in the drawing, for instance into a heat-exchanger, or to atmosphere.

The compressor 6 continually supplies air from the atmosphere to the open circuit in the plant to replace the quantity withdrawn. This make-up quantity is introduced into the heat-exchanger 2 at a point at which the working medium flowing back from the turbine 4 is at approximately the same temperature as the make-up quantity.

The turbine 4 operated by the working-medium in the circuit drives the compressors 1 and 6, while the turbine 10 operated by the quantity withdrawn produces the useful output given off to the outside. This useful output turbine 10 drives the ship's propeller 13 through a gear 11. The common shaft of the turbine 4 and the compressors 1 and 6, to which further a starting motor is coupled, can be connected to the gear 11 by means of an hydraulic coupling 14. A further hydraulic coupling 12 is provided between the gear 11 and the main power shaft 17 to which a propeller 13 is connected.

For starting the plant the hydraulic coupling 12, which in normal service transmits the power to the propeller 13, is emptied and the coupling 14, which permits power to be transmitted from the useful output turbine to the compressor shaft, is filled. All the turbomachines (1, 4, 6, 10) are now driven by the starting motor at a speed lower than that used in normal service. The compressors 6 and 1 begin to deliver working medium.

In order to diminish the power absorbed by the compressor 6, the blow-off valves 7 and 8 in the by-pass pipes can first of all be opened, so that the working medium is introduced into the circuit at atmospheric pressure. The turbine 4 at first runs without load. By way of the hydraulic coupling 14 the useful output turbine 10 is also set in motion. The air in the circuit is brought into circulation by the compressor 1. At the same time air is supplied to the burner of the gas heater 3, so that fuel can be supplied and ignited. After the burner has been put into service, the air compressed in the circuit is supplied to the turbine 4 at a higher temperature.

At the same time the useful output turbine 10 receives waste gases from the gas heater 3. The power thus produced by the turbines 4 and 10 enables the speed of the compressors 1 and 6 to be increased. The valves 7 and 8 in the by-pass pipe can then be gradually closed according to the increase of the power developed by the turbines 4 and 10. Acceleration of the compressors permits the pressures prevailing in the circuit to be increased up to the point when normal no-load working conditions are reached. The starting motor 9 can be switched out while the turbines are still being accelerated.

When the power developed by the compressor turbine 4 increases during starting, the power developed by the useful output turbine 10 is diminished. For this purpose a valve 15 is provided in the gas supply pipe of the useful output turbine 10 and another valve 16 is provided in a by-pass pipe. By the gradual closing of the valve 15 and the corresponding opening of the valve 16, the power given off by the useful output turbine 10 is decreased.

When the normal no-load working conditions are reached, the hydraulic coupling 14 is emptied, while coupling 12 is filled. As soon as valve 15 is opened and valve 16 closed, so that gas is again supplied to the turbine 10, the propeller 13 is driven by way of the gear 11 and the coupling 12.

The device for diminishing or interrupting the power given off by the useful output turbine 10 to the ship's propeller may, instead of being a fluid coupling, also have the form of any other coupling, for instance a mechanical, an electrical or a magnetic coupling. It is also possible, however, instead of providing a propeller with rigid blades, to provide one with adjustable blades, which can be so adjusted during the starting process that the blades cut through the water in a vertical plane without producing any effect of propulsion.

Instead of a screw propeller other types of propeller may also be used, for instance completely or partly submerged vane wheels, the vanes of which can be adjusted during each revolution to correspond to the flow desired. The power developed by the useful output turbine can be transmitted during starting to one compressor only or to part of the compressors instead of being transmitted to all the compressors. Instead of a gas turbine plant from the circuit of which a quantity of working medium is continually withdrawn, a plant can also be used which has a completely closed circuit or in which the working medium flows through the plant once only and is not again employed. The useful output turbine could also form part of the circuit, the compressor turbine or a part of it being driven by waste gases from the plant. Several useful output turbines might also be provided. Several propellers might also be used instead of one. When several useful output turbines are employed, only part of the turbines can in some circumstances be made use of for driving compressors when starting, while the rest of the useful output turbines are at a standstill or in given cases are already giving off useful output. Even when one useful output turbine only is used, a small part of the power developed by it during starting might be employed as useful output.

I claim:

1. A gas turbine plant comprising, in combination, a main power shaft, a main gas turbine, an auxiliary gas turbine, an air compressor directly connected to and driven by said auxiliary turbine, power transmission means interconnecting said two turbines, and a regulatable power transmission means interconnecting said first power transmission means and said main power shaft for reducing the power supplied to said shaft and increasing the power contribution of said main turbine to said compressor during starting of the plant.

2. A gas turbine plant comprising, in combination, a main power shaft, a main gas turbine, an auxiliary gas turbine, an air compressor directly connected to and driven by said auxiliary turbine, power transmission means interconnecting said two turbines, and a disconnectable coupling means interconnecting said power transmission means and said main power shaft for interrupting the power supplied to said shaft and increasing the power contribution of said main turbine to said compressor during starting of the plant.

3. A gas turbine plant as set forth in claim 1, comprising, in addition, a second regulatable power transmission means interposed between said first power transmission means and said auxiliary turbine.

4. A gas turbine power plant for driving a propeller, comprising, in combination, a main gas turbine, an auxiliary turbine, an air compressor connected to and driven by said auxiliary turbine, power transmission means interconnecting said two turbines, an adjustable propeller and an adjustable power transmission means connected to and interconnecting said power transmission means and said propeller and affording increase of power contribution of said main turbine to said compressor during starting of the plant.

5. A gas turbine plant as claimed in claim 1 in which said main gas turbine comprises an adjustable gas by-pass for passing operating gas by said main turbine and reducing its output at periods when power supply by said main turbine to said first transmission means is not desired.

6. A gas turbine power plant comprising, in combination, a power shaft, a main gas turbine, an auxiliary turbine, power transmitting means interconnecting said two turbines and comprising controllable power transmitting means, and an adjustable power transmitting means connected to and interconnecting said first power transmitting means and said power shaft, said controllable as well as said adjustable power transmitting means being controllable and adjustable during operation of said plant and the first being set for full power transmission and the second being set for no power transmission during starting of the plant.

7. A gas turbine plant comprising, in combination, a main power shaft, a main gas turbine, an auxiliary gas turbine, power transmission means interconnecting said two turbines, regulatable power transmission means interconnecting said first power transmission means and said main power shaft, and an air compressor directly connected to and driven by said auxiliary turbine and furnishing compressed air for the operation of said plant.

RENÉ STRUB.

REFERENCES CITED

The following references are of record in the file of this patent:

UNITED STATES PATENTS

| Number | Name | Date |
|---|---|---|
| 1,887,717 | Koch | Nov. 15, 1932 |
| 2,077,452 | Wren | Apr. 20, 1937 |
| 2,095,991 | Lysholm | Oct. 19, 1937 |
| 2,306,953 | Jung | Dec. 29, 1942 |
| 2,374,510 | Traupel | Apr. 24, 1945 |